J. HAGGERTY.
PILE FABRIC LOOM.
APPLICATION FILED DEC. 14, 1910.

1,059,151.

Patented Apr. 15, 1913.

WITNESSES
Johna Bergstrom
Geo. J. Hooster

INVENTOR
John Haggerty
BY
Munn & Co.
ATTORNEYS

J. HAGGERTY.
PILE FABRIC LOOM.
APPLICATION FILED DEC. 14, 1910.

1,059,151.

Patented Apr. 15, 1913.

WITNESSES

INVENTOR
John Haggerty
BY
ATTORNEYS

J. HAGGERTY.
PILE FABRIC LOOM.
APPLICATION FILED DEC. 14, 1910.

1,059,151.

Patented Apr. 15, 1913.

WITNESSES

INVENTOR
John Haggerty
BY
ATTORNEYS

J. HAGGERTY.
PILE FABRIC LOOM.
APPLICATION FILED DEC. 14, 1910.

1,059,151.

Patented Apr. 15, 1913.

WITNESSES

INVENTOR
John Haggerty
BY
ATTORNEYS

J. HAGGERTY.
PILE FABRIC LOOM.
APPLICATION FILED DEC. 14, 1910.

1,059,151.

Patented Apr. 15, 1913.
7 SHEETS—SHEET 5.

WITNESSES

INVENTOR
John Haggerty
BY
ATTORNEYS

J. HAGGERTY.
PILE FABRIC LOOM.
APPLICATION FILED DEC. 14, 1910.

1,059,151.

Patented Apr. 15, 1913.
7 SHEETS—SHEET 6.

WITNESSES

INVENTOR
John Haggerty
BY
ATTORNEYS

UNITED STATES PATENT OFFICE.

JOHN HAGGERTY, OF NEW YORK, N. Y.

PILE-FABRIC LOOM.

1,059,151.  Specification of Letters Patent.  Patented Apr. 15, 1913.

Application filed December 14, 1910. Serial No. 597,330.

*To all whom it may concern:*

Be it known that I, JOHN HAGGERTY, a citizen of the United States, and a resident of the city of New York, borough of Manhattan, in the county and State of New York, have invented a new and Improved Pile-Fabric Loom, of which the following is a full, clear, and exact description.

The invention relates to pile fabric looms for weaving pile fabrics of the oriental rug type having Persian knots.

The object of the invention is to provide a new and improved pile fabric loom, arranged to insure the proper formation of a continuous pile warp thread into knots, to draw the knots tight with a view to form a high grade rug in which the piles are not liable to become loose and be drawn out when sweeping or cleaning the rug.

For the purpose mentioned a continuous pile warp thread is interwoven with a pair of ground warp threads to form a Persian knot, and use is made of three heddles, one for the pile warp thread and the others for the ground warp threads, a fixed shogging device having curved dents for crossing and uncrossing the ground warp threads, and a dobby having an up and down movement and provided with alternating long and short dents, of which the short dents have eyes for the passage of the pile warp threads, while a pair of ground warp threads passes between adjacent long dents and alternately to opposite sides of the short dents carrying the pile warp threads to be interwoven with the corresponding pair of ground warp threads.

A practical embodiment of the invention is represented in the accompanying drawings forming a part of this specification, in which similar characters of reference indicate corresponding parts in all the views.

Figure 5:
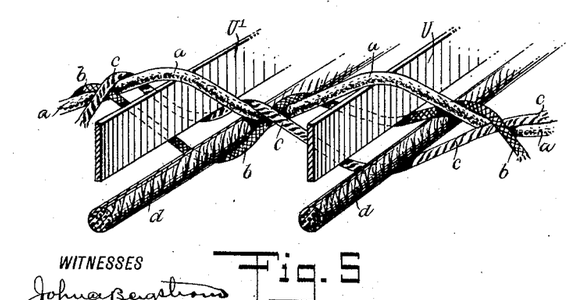
Fig. 5 is an enlarged perspective view of the fabric adjacent to the cloth beam and prior to withdrawing the pile wires.
Figure 6:
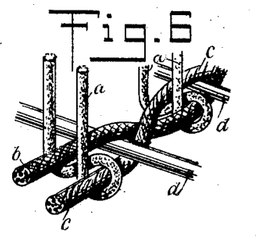
Fig. 6 is an enlarged sectional perspective view of a Persian knot tied to a pair of ground warp threads.

The pile fabric woven by the loom, and illustrated in Figs. 5 and 6, consists of sets of warp threads $a$, $b$ and $c$, of which $a$ is the pile warp thread and $b$ and $c$ are a pair of ground warp threads, which are interwoven with weft threads $d$ for binding the ground warp threads $b$ and $c$ together. The pile thread $a$ is looped around the ground warp threads $b$ and $c$ in such a manner as to form Persian knots, that is, the pile warp thread $a$ is looped completely around one ground warp thread and passes around the other ground warp thread, one pile end extending between the ground warp thread and the other pile end extending outside the other ground warp thread, as plainly shown in Fig. 6, complete successive loops being arranged alternately on the ground warp threads $b$ and $c$.

Figure 1:
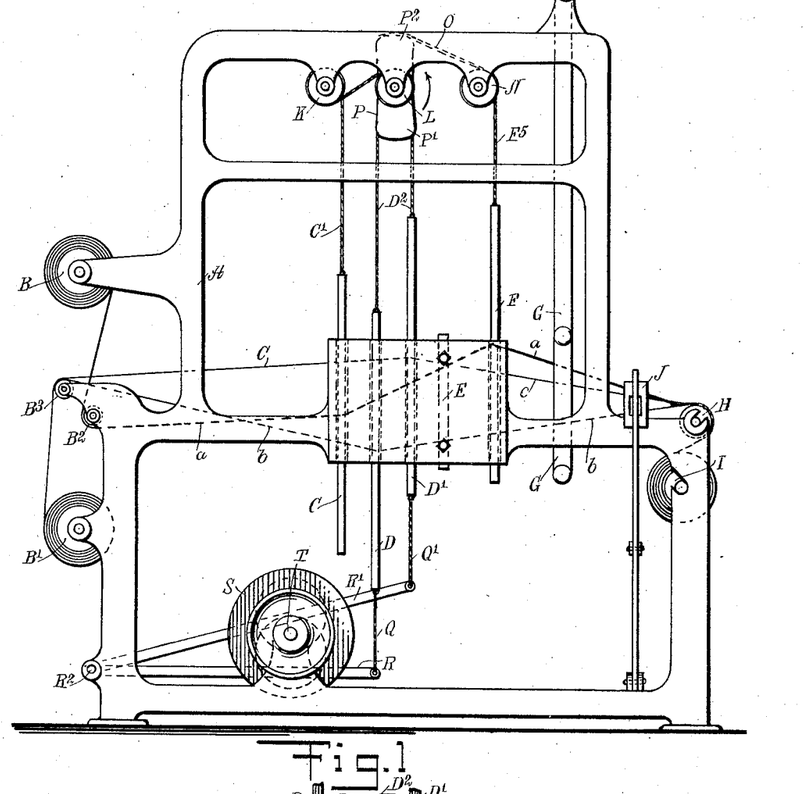
Figure 1 is a side elevation of the loom.
Figure 3:
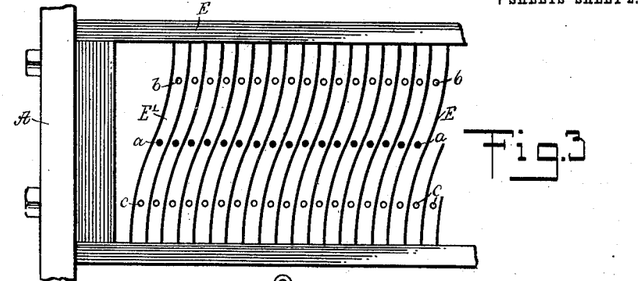
Fig. 3 is an enlarged face view of the fixed shogging device.
Figure 4:
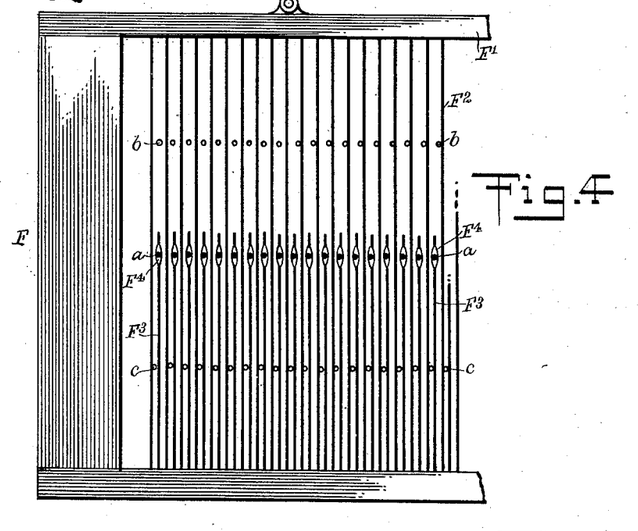
Fig. 4 is a like view of the dobby.

The loom for producing the weave is arranged as follows: On a suitably constructed frame A are mounted the warp beams B, B' carrying the pile warp thread $a$ and the ground warp threads $b$ and $c$, respectively, the pile warp thread $a$ passing under a guide roller $B^2$ and then through a heddle C, and the ground warp threads $b$ and $c$ passing from the warp beam B' over a guide roller $B^3$ and then the heddles D, D', respectively. The warp threads $a$, $b$ and $c$ of each set of warp threads after leaving the heddles C, D and D' pass between adjacent transversely curved dents E' of a shogging device E fixed to the frame A in front of the heddle D'. In front of the fixed shogging device E is arranged an up and down moving reed F, which acts as a dobby and is provided with a reed frame F' and alternately arranged long and short dents $F^2$, $F^3$, of which the short dent $F^3$ is provided at its upper end with an eye $F^4$ for the passage of the pile warp thread $a$, while the ground warp threads $b$ and $c$ pass between adjacent long dents $F^2$ and alternately to opposite sides of the short dent F³, as hereinafter more fully described.

The warp threads $a$, $b$ and $c$ after leaving the reed F pass through the lay G and to the fabric $e$ at the breast beam H, the fabric winding up on the cloth beam I in the usual manner. A shuttle mechanism J of any approved construction serves to pass the weft threads $d$ through the open sheds, as hereinafter more fully described in detail.

Figure 2:
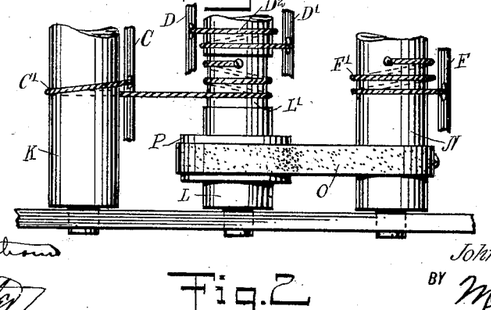
Fig. 2 is an enlarged plan view of the overhead mechanism for actuating the heddles and the dobby.

The pile thread heddle C is suspended by ropes or other flexible connections C' from a drum K journaled in suitable bearings in the upper portion of the main frame A, and the said flexible connections C' after passing once or twice around the drum K extend over pulleys L' secured to or formed on the drum L likewise journaled in suitable bearings on the upper portion of the main frame A. The flexible connections D² for the ground warp heddles D and D' pass around the drum L on opposite sides thereof so that when the heddle D moves upward the other heddle D' moves downward and vice versa. The reed F is suspended by flexible connections F⁵ from a drum N journaled in the upper portion of the main frame A, so that when the drum N is turned the reed F moves up and down in suitable guideways arranged on the main frame A. The drum N is connected by belts or like flexible connections O with a cam P secured to or formed on the drum L, so that when the latter is rotated the drum K and the drum N are caused to move up and down in such a manner that the pile warp heddle C moves up and down with the ground warp heddle D but at a different speed owing to the difference in diameters of the drum K and the drum L, and the reed F moves up and down once for every complete up or down movement of either ground warp heddle D or D'. For the purpose mentioned the cam P consists of two diametrically-extending connections P' and P², and the flexible connections O are connected with the cam P at the middle thereof, as plainly indicated in the drawings. The lower ends of the ground warp heddles D and D' are connected by flexible connections Q and Q' with heddle levers R and R', fulcrumed at R² on the main frame and connected with circular cams S secured on a shaft T extending transversely and journaled in suitable bearings on the main frame A. The shaft T is driven by a suitable mechanism which also imparts a forward and backward swinging movement to the lay G, but as such mechanism may be of any approved construction it is not deemed necessary to further show and describe the same as such mechanisms are common in looms as heretofore constructed.

Figure 7:
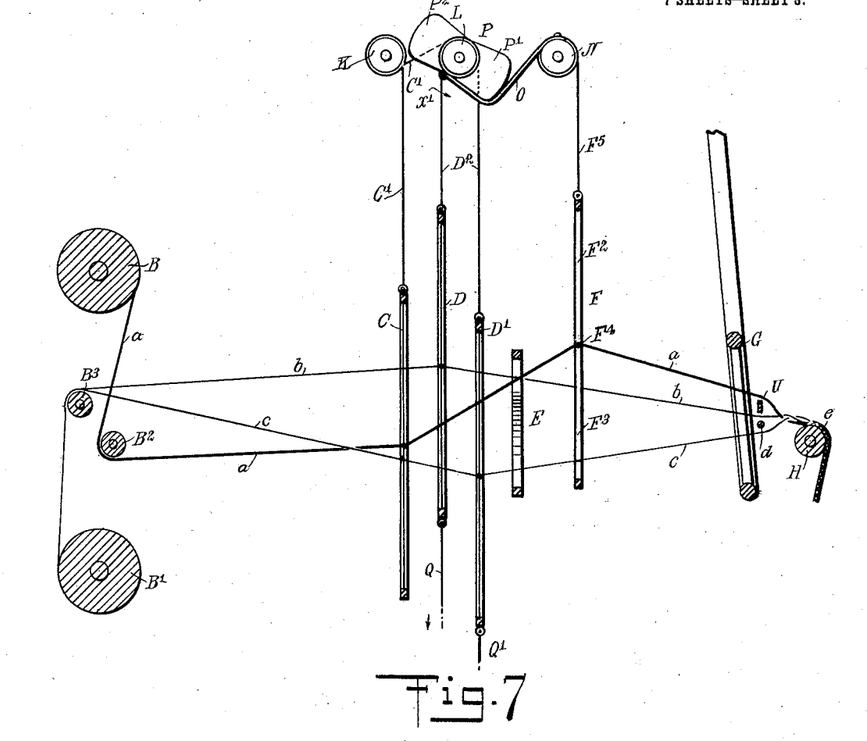
Figs. 7, 9, 11, 13 and 15 are enlarged sectional side elevations.
Figure 8:
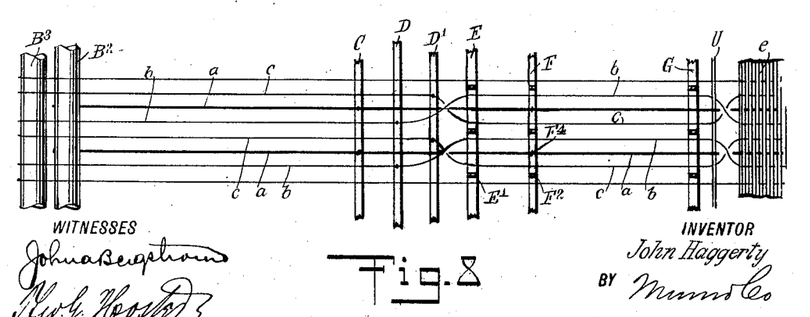
Figs. 8, 10, 12, 14 and 16 are corresponding plan views of the loom, illustrating the successive steps in the formation of the fabric.
Figure 9:
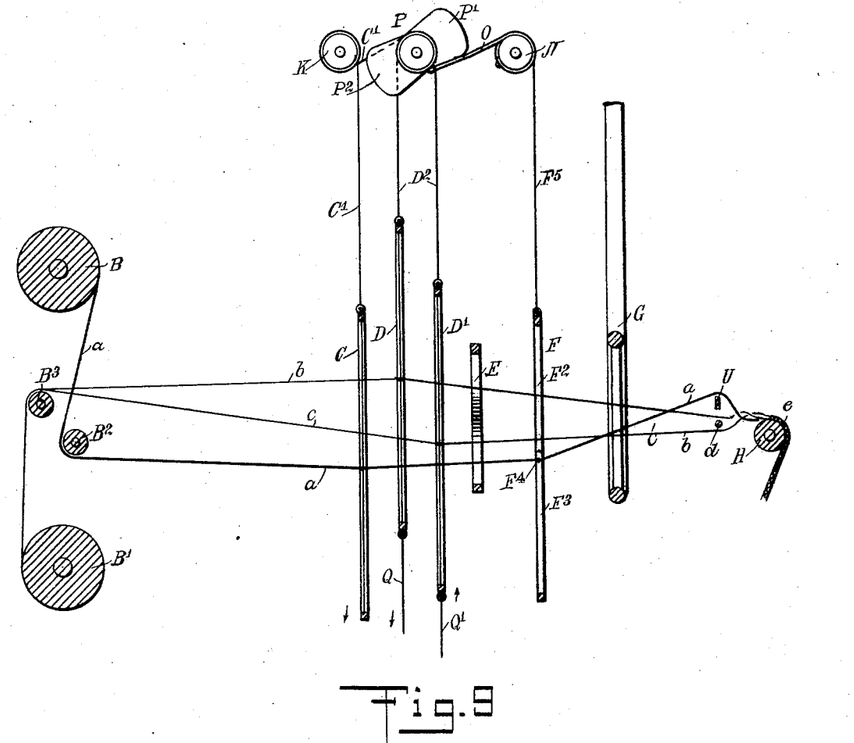
Figure 10:
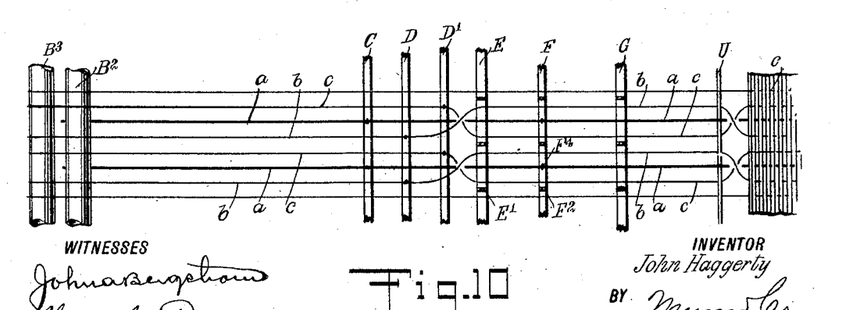
Figure 11:
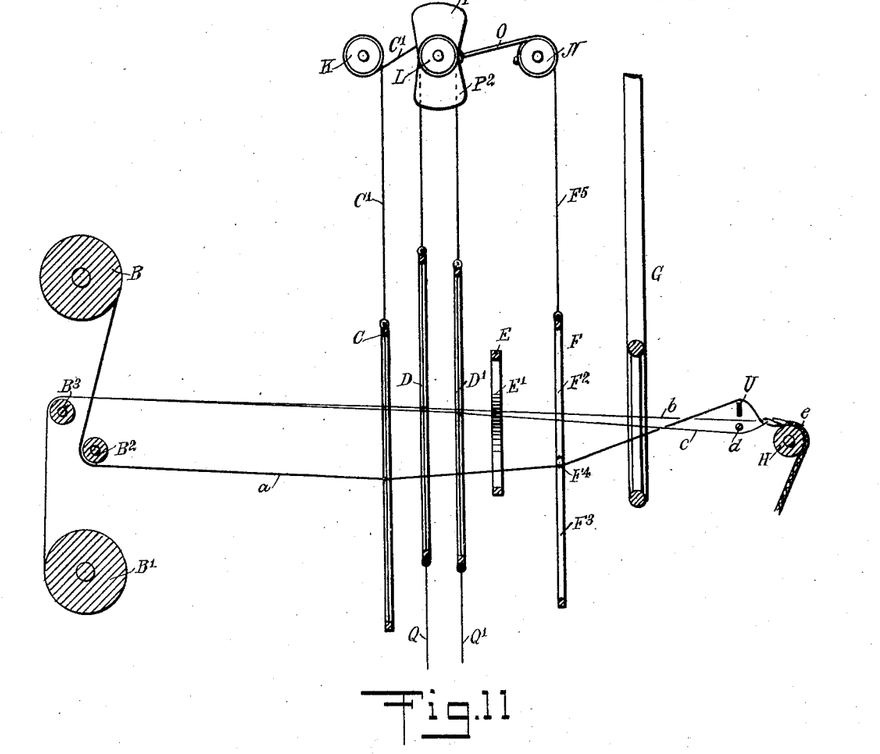
Figure 12:
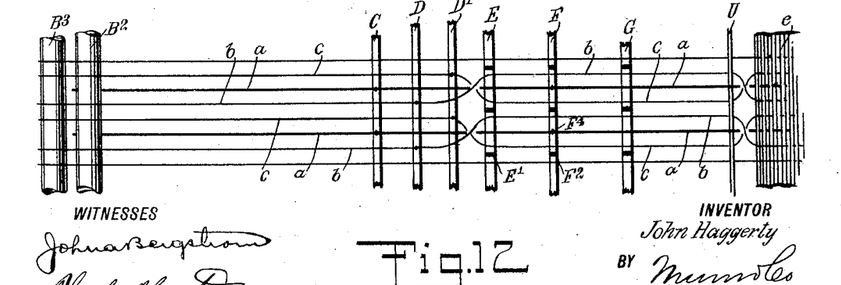
Figure 13:
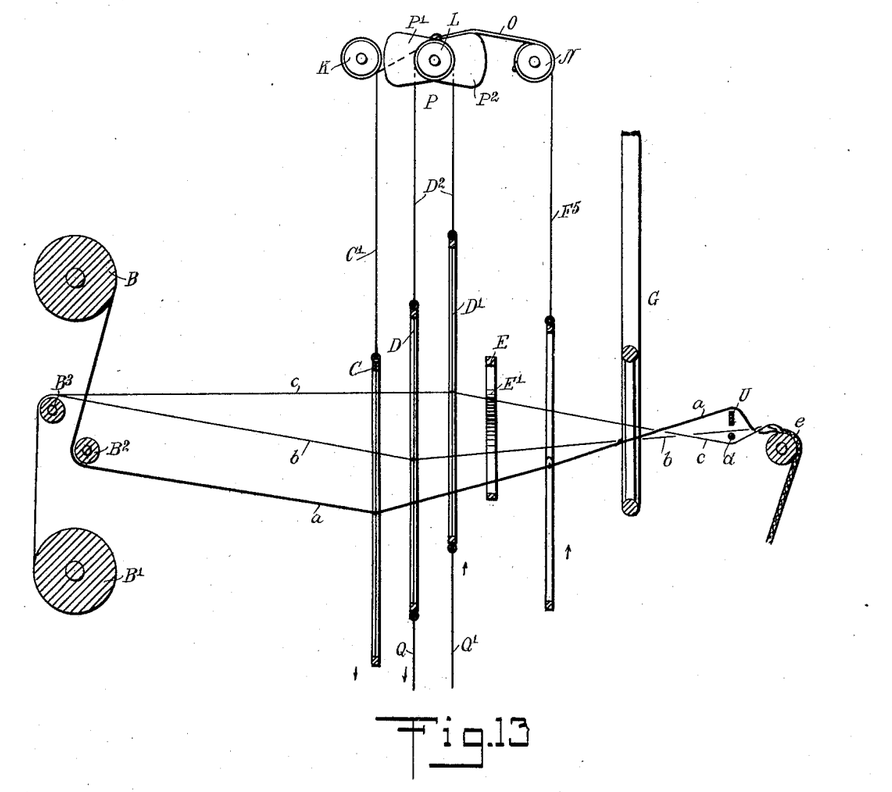
Figure 14:
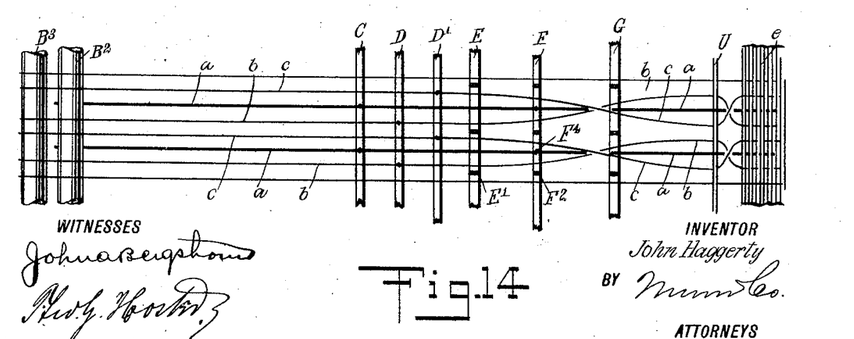
Figure 15:
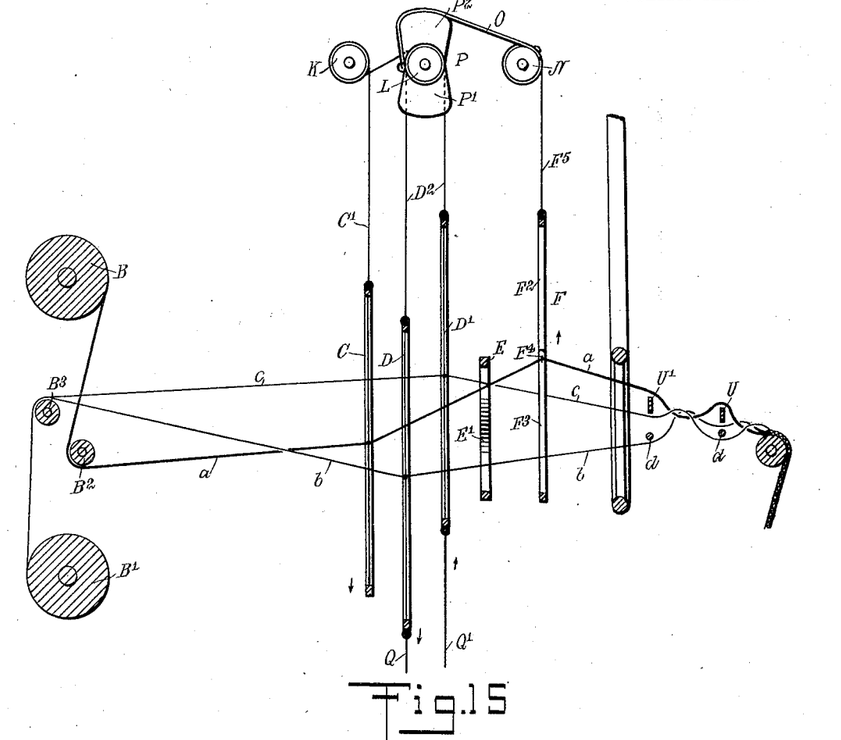
Figure 16:
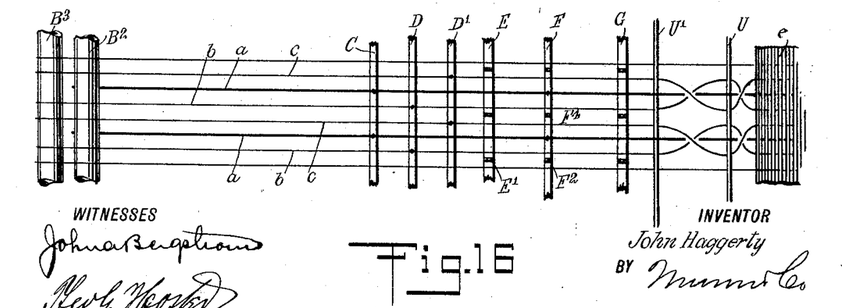

The operation is as follows: When the several parts are in the position as shown in Figs. 7 and 8, a pile wire U and a weft thread $d$ are inserted through the open shed in such a manner that the pile wire U extends between the pile warp thread $a$ and the ground warp thread $b$ while the weft thread $d$ extends between the ground warp threads $b$ and $c$, the said pile wire U and the weft thread $d$ being beaten up by the lay G. The lay G now swings backward to normal position, as shown in Figs. 9 and 10, and the heddles C and D and the reed F move downward while the heddle D' moves upward owing to the downward pull exerted on the heddle D by the flexible connection Q, lever R and cam mechanism S, it being understood that by this downward pull of the heddle D the flexible connection D² rotates the drum L in the direction of the arrow $x'$, whereby the drum K is rotated in the reverse direction to lower the heddle C while the cam P releases the flexible connection O and allows the reed F to move downward quicker than the heddle D, which latter moves downward faster than the heddle C, while the heddle D' rises in the same proportion as the heddle D moves downward. The parts now assume the position shown in Figs. 9 and 10, and in doing so the pile warp thread $a$ moves into a lowermost position in the heddles C, D, D', the shogging device E and the reed F, while the ground warp threads $b$ and $c$ are above the pile warp thread $a$ in the said parts, and when the heddles D and D' are in approximately a like middle position as shown in Fig. 11, the reed F begins to rise while the heddles C and D still descend and the heddle D' rises still higher, so that the parts finally reach the position shown in Figs. 13, 14, 15 and 16, that is, until the heddles C and D are in their lowermost positions, while the heddle D' has risen to its uppermost position and the reed F has returned to its uppermost position, that is, the reed F has made a complete down and upward movement during the time the heddles C and D descended to their lowermost positions and the heddle D' has risen to its uppermost position. Now during this movement the pile warp thread $a$ was carried down between the ground warp threads $b$ and $c$, which were crossed in front of the pile wire U and weft thread $d$ and crossed in the rear of the shogging device E with the ground warp thread $b$ in an uppermost position and the ground warp thread $c$ in a lowermost position. Thus by reference it will be seen that the ground warp threads $b$ and $c$ are extended parallel from the shogging device E to the lay G, whereby the pile warp thread $a$ was carried between the said parallel ground warp threads during the downward movement of the reed F. When the heddles C, D, D' shifted their position the ground warp threads $b$ and $c$ were first uncrossed in the rear of the shogging device E and then again crossed but in an opposite direction by the shogging device E owing to the curvature in the dents E' of the said shogging device E, as will be readily understood by reference to Fig. 3. Thus when the reed F moves upward, its short dent F³ carries the pile warp thread $a$ again between the ground warp threads $b$ and $c$. When the parts finally reach the position shown in Figs. 15 and 16, a second pile wire U' and another weft thread $d$ are inserted in the open sheds formed between the pile warp thread $a$ and the ground warp thread $c$ for the pile wire U' and the ground warp threads $c$ and $b$ for the second weft thread $d$. The lay G now beats up the pile wire U' and the second weft thread $d$ and then the above-described operation is repeated with the difference that the heddles C, D rise while the heddle D' descends and at the same time the reed F makes a complete down and up movement during the time of the rising of the heddles C and D and the dropping of the heddle D'.

It is understood that during the time the heddles C, D drop and the heddle D' rises the cam part P' of the cam P causes a rising and falling of the reed F, and during the time the heddles C, D rise and the heddle D' drops, the other cam part P² causes an up and down sliding movement of the reed F. The up and down sliding movement of the reed F is sufficiently intermittent to permit a proper change of ground warp threads $b$ and $c$ to cross and uncross the same without interference with the pile warp thread $a$. It is further understood that on crossing and uncrossing the ground warp threads $b$ and $c$ by the action of the up and down movement of the said ground warp threads in the fixed shogging device E, the said ground warp threads are also shifted to opposite sides of the short dent F³ to cause the short dent to readily pass between the ground warp threads during the upward or downward movement of the reed F.

The pile wires U, U' when withdrawn from the fabric cut the pile warp thread $a$, whereby the ground warp threads $b$ and $c$ return to parallel positions and in doing so the pile ends assume the proper position shown in Fig. 6 with the pile thread completely looped around one ground warp thread and passed under the other ground warp thread, and with one pile end extending between the ground warp threads $b$ and $c$, and the other pile end extending outside of the ground warp thread $b$. The next Persian knot formed on the same ground warp thread has its complete loop extending around the ground warp thread $b$ instead of the ground warp thread $a$, but in the next following or third Persian knot the complete loop again extends around the ground warp thread $c$, that is, the complete loop extends alternately around the ground warp threads $b$ and $c$.

It will be noticed that the ground warp threads $b$ and $c$, after the pile wire and the weft $d$ are beaten up, remain crossed in front of the weft, that is, the ground warp threads are crossed between successive piles, thus aiding in binding the piles in position in the fabric.

The shuttle mechanism, the pile wire inserting and withdrawing device and the mechanism for the lay and the heddle and reed actuating mechanisms are all actuated from a main shaft, so that the several devices move synchronously to accomplish the desired result, and I do not limit myself to any particular actuating mechanism as the same may be varied to produce the same result.

For producing a desired pattern by the pile ends of the pile warp thread, the latter is in the form of a printed or colored pile warp thread.

Having thus described my invention, I claim as new and desire to secure by Letters Patent:

1. A pile fabric loom for interweaving a continuous pile warp thread with a pair of ground warp threads to form Persian knots, comprising a lay, a shuttle mechanism for inserting weft threads, a fixed shogging device having transversely curved dents for the passage of the pile warp threads and the ground warp threads, the shogging device being adapted to perform its function upon every change of shed, heddles for the ground warp threads, a reed having an up and down movement and provided with alternating long and short dents, of which the short dents have eyes for the passage of the pile warp threads, an overhead drum, suspension means for the ground warp heddles and winding and unwinding on the said drum, means for drawing the ground warp heddles alternately down, and actuating and suspending means for the said reed and controlled from the said drum.

2. A pile fabric loom for interweaving a continuous pile warp thread with a pair of ground warp threads to form Persian knots, comprising a lay, a shuttle mechanism for inserting weft threads, a fixed shogging device having transversely curved dents for the passage of the pile warp threads and the ground warp threads, the shogging device being adapted to perform its function upon every change of the shed, heddles for the ground warp threads, a reed having up and down movement and provided with alternating long and short dents, of which the short dents have eyes for the passage of the pile warp threads, an overhead drum, suspension means for the ground warp heddles and winding and unwinding on the said drum, means for drawing the ground warp heddles alternately down, cams on the said drum, and a flexible connection between the said cams and the said reed to raise and lower the latter.

In testimony whereof I have signed my name to this specification in the presence of two subscribing witnesses.

JOHN HAGGERTY.

Witnesses:
　THEO. G. HOSTER,
　PHILIP D. ROLLHAUS.

Copies of this patent may be obtained for five cents each, by addressing the "Commissioner of Patents, Washington, D. C."